(12) United States Patent
Nagahama

(10) Patent No.: US 9,658,604 B2
(45) Date of Patent: May 23, 2017

(54) ELECTRONIC TIMEPIECE WITH INTERNAL ANTENNA

(71) Applicant: Seiko Epson Corporation, Tokyo (JP)

(72) Inventor: Toshitaka Nagahama, Shiojiri (JP)

(73) Assignee: Seiko Epson Corporation (JP)

( * ) Notice: Subject to any disclaimer, the term of this patent is extended or adjusted under 35 U.S.C. 154(b) by 516 days.

(21) Appl. No.: 14/027,548

(22) Filed: Sep. 16, 2013

(65) Prior Publication Data

US 2014/0085154 A1    Mar. 27, 2014

(30) Foreign Application Priority Data

Sep. 24, 2012 (JP) ................................. 2012-209260

(51) Int. Cl.
 *G04R 60/10* (2013.01)
(52) U.S. Cl.
 CPC .................................. *G04R 60/10* (2013.01)
(58) Field of Classification Search
 CPC ................................................... G04R 60/10
 USPC ........................................................ 343/720
 See application file for complete search history.

(56) References Cited

U.S. PATENT DOCUMENTS

| 5,768,217 A | * | 6/1998 | Sonoda | ................ | G04B 47/025 |
| | | | | | 343/718 |
| 2006/0220957 A1 | * | 10/2006 | Tanaka | .................. | H01Q 1/273 |
| | | | | | 343/700 R |
| 2011/0102274 A1 | * | 5/2011 | Fujisawa | ................ | G04G 5/002 |
| | | | | | 343/702 |

FOREIGN PATENT DOCUMENTS

| JP | 09-247006 | 9/1997 |
| JP | 09-307329 | 11/1997 |
| JP | 2013-050349 A | 3/2013 |
| JP | 2013-050370 A | 3/2013 |
| JP | 2013050336 A | 3/2013 |

* cited by examiner

*Primary Examiner* — Dameon E Levi
*Assistant Examiner* — Walter Davis
(74) *Attorney, Agent, or Firm* — Harness, Dickey & Pierce, P.L.C.

(57) ABSTRACT

An electronic timepiece has; an annular antenna; and a time display unit. The antenna includes an annular dielectric; a conductive driven element that is disposed on the dielectric, is ring-shaped with a notch therein (C-shaped), and is fed with a specific potential; and a conductive parasitic element that is disposed on the dielectric with a gap to the driven element, and is an endless ring or a ring with a notch therein (C-shaped). A feed position to which a specific potential is fed is disposed to the driven element at one place. When the electronic timepiece is seen in plan view, the feed position is disposed in a range from approximately 8:00 to approximately 10:00 relative to the center (center pivot) of the electronic timepiece.

4 Claims, 12 Drawing Sheets

ELECTRONIC TIMEPIECE WITH INTERNAL ANTENNA

BACKGROUND

1. Technical Field

The present invention relates to an electronic timepiece with an internal antenna.

2. Related Art

Japanese Unexamined Patent Appl. Pub. JP-A-H09-307329 teaches an electronic timepiece having a loop antenna 20 formed along the outside circumference below the crystal 5, and lugs 2 for attaching a wrist band at the 12:00 and 6:00 positions of the case 1. As shown in FIG. 1 of JP-A-H09-307329, an electrode 21 for the antenna 20 is also disposed near one of the lugs 2, that is, the electrode 21 of the antenna 20 is disposed at 12:00 or 6:00.

Japanese Unexamined Patent Appl. Pub. JP-A-H09-247006 discloses disposing an antenna 11 that functions as a loop antenna in unison with the case 17 of a wrist-worn receiver. As shown in FIG. 1 of JP-A-H09-247006, lugs 21 for attaching a band 41 are formed at two locations on the case 17, and a feed opening 15 for the antenna 11 is disposed near one set of lugs 21.

Because signals from GPS (Global Positioning System) satellites cannot be received indoors, an electronic wristwatch must receive signals from GPS satellites when the user is outdoors. When outdoors, the arm of the user on which the wristwatch is worn is often hanging down at the side or in front of the user's body. In this posture, the normal direction of the face of the wristwatch is horizontal. For example, with an annular (O-shaped) loop antenna or a C-shaped loop antenna having part of the ring missing, radiant directivity in the plane including the loop plane is greatest at or near the direction in which the feed electrode is disposed as seen from the center of the ring. Therefore, arm of the user on which the wristwatch is worn hanging down or held in front of the body, sufficient reception performance cannot be achieved with the loop antennae disclosed in JP-A-H09-307329 or JP-A-H09-247006 because the direction of maximum radiation where antenna gain is greatest is the direction parallel to the band, that is, towards the horizon instead of the zenith.

SUMMARY

An electronic timepiece with internal antenna according to the present invention can maintain sufficient reception performance while reducing the size of the antenna.

An electronic timepiece with internal antenna according to one aspect of the invention has a case; an annular antenna housed in the case; and a time display unit that is housed in the case and displays time. The antenna includes an annular dielectric; a conductive driven element that is disposed on the dielectric, is ring-shaped with a notch therein, and is fed with a specific potential; and a conductive parasitic element that is disposed on the dielectric with a gap to the driven element, and is an endless ring or a ring with a notch therein. A feed position to which a specific potential is fed is disposed to the driven element at one place, and the feed position is disposed in an angular range from approximately 8:00 to approximately 10:00 from the center of the electronic timepiece with internal antenna when the electronic timepiece with internal antenna is seen in plan view.

In this aspect of the invention a conductive driven element that is ring-shaped with a notch therein and is fed with a specific potential, and a conductive parasitic element that is an endless ring or a ring with a notch therein, are disposed on the annular dielectric with a gap therebetween. Because current is also induced in the parasitic element when current flows to the driven element, the driven element and parasitic element couple electromagnetically, and together function as an antenna element that converts electromagnetic waves to current.

The complete antenna functions as a closed-loop (such as O-shaped) or an open-loop (such as C-shaped) loop antenna. The radiant directivity in the plane including the loop plane of this loop antenna is greatest in or near the direction of the feed position from the center of the loop.

Therefore, by disposing the feed position in the direction of approximately 8:00 to approximately 10:00 from the center of the electronic timepiece with internal antenna when the electronic timepiece with internal antenna is seen in plan view, the direction of maximum radiation of the antenna faces the zenith when the user's arm on which the electronic timepiece with internal antenna is worn is hanging down at the side or in front of the body as shown in FIG. 7, and sufficiently good reception performance can be obtained with the antenna. The antenna according to this embodiment of the invention therefore provides the optimal practical antenna directivity based on the frequent posture of the user when outdoors.

Furthermore, because the antenna has an annular dielectric, the circumference length of the antenna can be shortened using the wavelength shortening effect of the dielectric, and the size of the antenna can therefore be reduced.

For example, by setting the length of the parasitic element disposed to the dielectric to resonate to the radio signals to be received, the length of the driven element disposed to the dielectric can be set appropriately. The impedance of the antenna and the circuit electrically connected to the antenna can therefore be easily matched.

Furthermore, by electromagnetically coupling the parasitic element to the driven element, the invention can reduce the resonance frequency of the antenna and improve the impedance characteristic. Return loss at the resonance frequency can therefore be reduced, and the reception performance of the antenna to the radio signals to be received can be increased, by matching the resonance frequency of the antenna to the signals to be received.

The invention can therefore reduce the size of the antenna while maintaining sufficient reception performance.

Annular means a shape like an endless ring with no break therein, and the shape of the ring could be round, oval, rectangular, or other polygon.

The time display unit may indicate the time by rotating hands 13 (13a-13c) on a center pivot 12 over a dial 11, or have an LCD panel with a display area of a size equal to the dial 11 and display the time by displaying an image of a dial 11 and hands 13 in the display area, or display time digitally on an LCD panel 15 as shown in FIG. 16, for example.

Disposed to or on the dielectric is also not limited to being disposed on the surface of the dielectric, and includes being embedded in the dielectric. More specifically, the driven element and parasitic element may be formed on the surface of the dielectric by plating or a silver paste printing process (FIG. 5, FIG. 10, FIG. 13, FIG. 15), or embedded in the dielectric (FIG. 11) by insert molding, for example.

In an electronic timepiece with internal antenna according to another aspect of the invention, the driven element is disposed on the inside of the parasitic element relative to the center axis of the dielectric.

For example, as further described below, part of the side of the case (case 80) may be made from metal or other conductive material. Because the area near the antenna has high current density and is sensitive to external factors, the reception performance of the antenna becomes unstable when the case 80 is touched with a finger. However, by disposing the driven element on the inside of the parasitic element, the distance from the side of the case (case 80) to the driven element can be increased compared with a configuration having the driven element on the outside of the parasitic element, and the reception performance of the antenna can be stabilized.

In an electronic timepiece with internal antenna according to another aspect of the invention, the dielectric has a flat top surface, and a slope formed from the top surface so that the height to the time display unit decreases to the inside; and the driven element is disposed on the slope.

This aspect of the invention can increase the distance from the side of the outside case (case 80) to the driven element, and can therefore stabilize the reception performance of the antenna. Furthermore, because the height to the time display unit decreases as the slope goes to the inside, the time display unit can be read from a wide angle direction. Furthermore, because the driven element is disposed to this slope, radio waves can be received from a wide range of angles, and good reception performance can be assured in the antenna.

An electronic timepiece with internal antenna according to another aspect of the invention preferably also has a circuit board that is housed in the case and has a reception circuit disposed thereto; and a coil spring that is housed in the case, disposed at the feed position, and feeds a specific potential to the driven element. One end of the coil spring is electrically connected to the driven element, the other end is electrically connected to the circuit board and is fed with the specific potential. The side part not including both ends is surrounded by a cylindrical conductive member to which ground potential is supplied.

When the specific potential is supplied to the driven element using a coil spring, the coil spring is electrically connected to the driven element and at the same potential as the driven element, and therefore functions as part of the loop antenna. In addition, because the coil spring produces a magnetic field when current flows, and picks up noise produced by the circuit elements and the stepper motor inside the electronic timepiece, the reception performance of the antenna drops due to the effects of this magnetic field and noise.

To solve this problem, this aspect of the invention surrounds the side part of the coil spring with a cylindrical conductive member to which the ground potential is supplied, and the cylindrical conductive member functions as a magnetic shield. Change in the current density near the antenna caused by the magnetic field produced by the coil spring, and the coil spring picking up noise from circuits and the stepper motor inside the electronic timepiece, are therefore suppressed, and good reception performance can be maintained in the antenna.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. Note that the size and scale of parts shown in the figures differ from the actual size and scale for convenience. Furthermore, the following examples are specific preferred embodiments of the invention and describe technically desirable limitations, and the scope of the invention is not limited thereby unless such limitation is specifically stated below.

Figure 1:
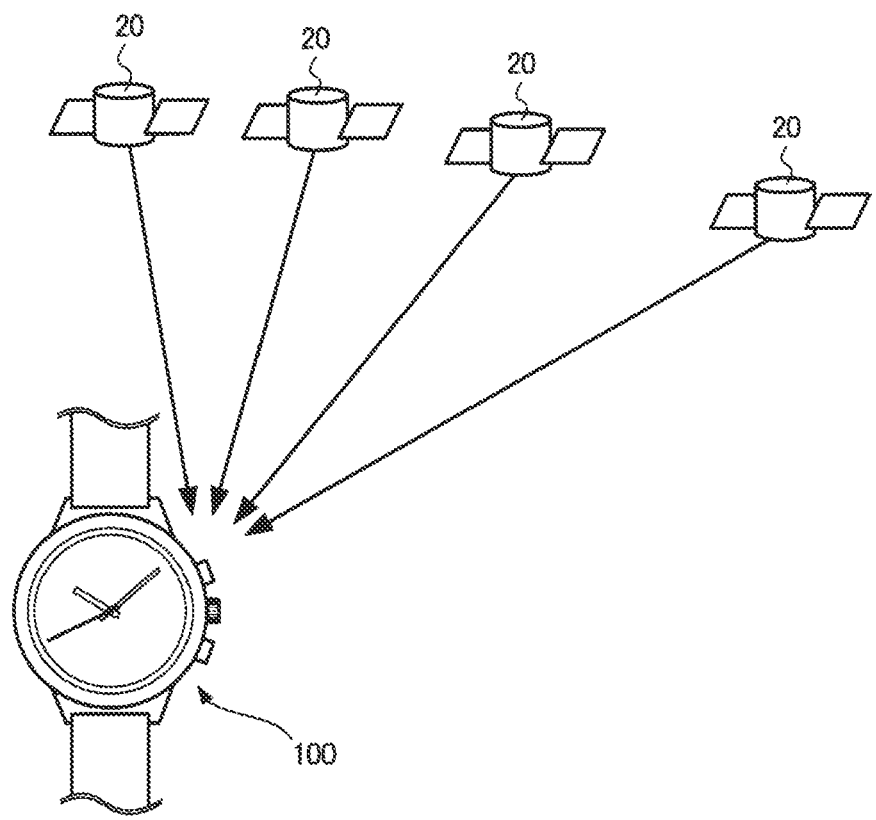
FIG. 1 shows the configuration of a time adjustment system using the GPS system.

FIG. 1 shows the general configuration of a time adjustment system using the GPS system.

The electronic timepiece 100 is a wristwatch that receives signals (radio signals) from GPS satellites 20 and adjusts the time based thereon, and displays the time on the surface (side) (referred to below as the "face") on the opposite side as the surface (referred to below as the "back") that contacts the wrist.

Each GPS satellite 20 is on a semi-geosynchronous orbit, and transmits a C/A (Coarse/Acquisition) code and navigation messages superimposed on a 1.57542 GHz RF signal (L1 signal). The 1.57542 GHz signal carrying a C/A code and navigation message is referred to herein as simply a "satellite signal." These satellite signals are right-handed circularly polarized waves.

A C/A code is a 1023-bit pseudorandom noise code unique to a specific GPS satellite 20. Each GPS satellite 20 carries an atomic clock, and the highly precise time information ("GPS time information" below) kept by the atomic clock is included in the navigation message as the time that the satellite signal was transmitted by the GPS satellite 20. The time difference of the atomic clock onboard each GPS satellite 20 is measured by the ground control segment, and a time correction parameter for correcting this time difference is also included in the navigation message. Precise orbit information (ephemeris) for the GPS satellite 20, general orbit information (almanac) for all GPS satellites 20 in the constellation, a UTC offset value indicating the offset between UTC (Coordinated Universal Time) and the GPS time, and an ionospheric correction parameter are also included in the navigation message.

After spectrum spreading of the navigation message with the C/A code, the GPS satellite 20 produces a satellite signal by BPSK (binary phase shift keying) modulation multiplying the spread-spectrum signal with the 1.57542 GHz carrier. The electronic timepiece 100 extracts the navigation message from the received satellite signal by reversing the flow of satellite signal generation by the GPS satellite 20 (demodulating the BPSK modulated signal, then spread-spectrum despreading). Because the C/A code used for spectrum spreading is different for each GPS satellite 20, the electronic timepiece 100 can determine from which GPS satellite 20 the signal was received.

The electronic timepiece 100 can accurately adjust the time kept by the electronic timepiece 100 (below, the "internal time") to the correct current time using the GPS time information and time correction parameter contained in the satellite signals received from a single GPS satellite 20.

The electronic timepiece 100 can also acquire positioning information (location information such as the latitude and longitude) indicating the current location of the electronic timepiece 100 by receiving satellite signals from at least three (normally four) or more GPS satellites 20 and extracting the GPS time information and orbit information (ephemeris) of each GPS satellite 20 contained in the received signals. The acquired positioning information can also be used to adjust the time zone.

The electronic timepiece 100 also calculates the distance to each GPS satellite 20 from the difference between the time that the satellite signal was received (arrival time) and the transmission time contained in the satellite signal, and calculates the current location of the electronic timepiece 100 by triangulation based on the distance to three or more GPS satellites 20. The electronic timepiece 100, however, uses a crystal oscillator, and cannot keep time as precisely as an atomic clock. A time error as short as one-millionth of a second results in a distance error of approximately 300 meters. As a result, the electronic timepiece 100 normally receives satellite signals from four or more GPS satellites 20 to correct the internal time while acquiring positioning information.

Figure 2:
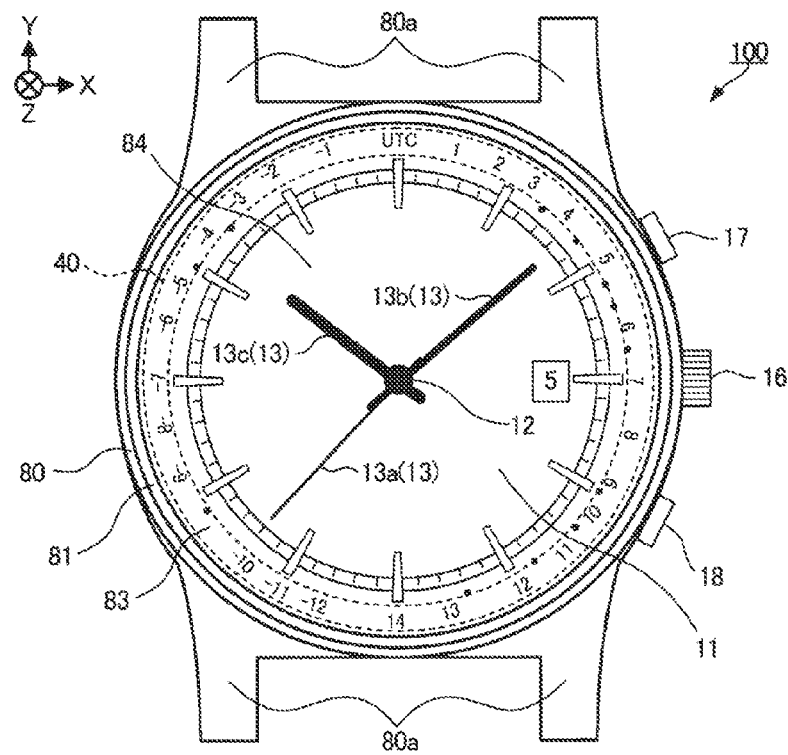
FIG. 2 is a plan view of an electronic timepiece.

FIG. 2 is a plan view of the electronic timepiece 100.

As shown in FIG. 2, the electronic timepiece 100 has a cylindrical outside case 80 made of metal or other conductive material. An annular bezel 81 made of a non-conductive material such as ceramic or plastic is fit to the top (face side) of the case 80, and the opening in the bezel 81 is covered by a transparent crystal 84.

Conductive lugs 80*a* formed in unison with the case 80 are disposed to the case 80 at two locations, at the top and the bottom as seen in the figure. A wristband for holding the electronic timepiece 100 on the wrist is attached to the lugs 80*a*.

An annular dial ring 83 made of a non-conductive material such as ceramic or plastic is disposed inside the bezel 81, and a round dial 11 is disposed inside the dial ring 83. Bar-shaped hour markers are disposed every 30 degrees around the dial ring 83, and part of each hour marker protrudes above the top of the dial 11. Additional minute markers are also inscribed every 6 degrees between adjacent hour markers. The markers could alternatively be disposed on the dial 11, and the numbers 1 to 12 could be used instead of the bar-shaped hour markers. The appearance of the dial ring 83 and the dial 11 are thus not limited to the appearance shown in the figure.

Hands 13 (second hand 13*a*, minute hand 13*b*, and hour hand 13*c*) that turn on a center pivot 12 and indicate the time, for example, are disposed above the dial 11. The user can see the dial ring 83, dial 11, and hands 13 through the crystal 84. An annular antenna 40 is disposed below (on the back side of) the dial ring 83.

The electronic timepiece 100 also has a crown 16 and pushers 17, 18. The crown 16 is at the 3:00 position, one pusher 17 is at the 2:00 position, and the other pusher 18 is at the 4:00 position. By operating the crown 16 and pushers 17, 18, the user can set the electronic timepiece 100 to a time information acquisition mode or positioning information acquisition mode. The time information acquisition mode is an operating mode for receiving satellite signals and acquiring the GPS time information and time correction parameter from at least one GPS satellite 20, and adjusting the internal time to the correct time. The positioning information acquisition mode is an operating mode for receiving satellite signals from at least three GPS satellites 20 to acquire the current location of the electronic timepiece 100 and adjust the internal time to the correct time reflecting the local time zone. The electronic timepiece 100 can also regularly automatically execute the time information acquisition mode and the positioning information acquisition mode.

The internal structure of the electronic timepiece 100 is described next.

Figure 3:
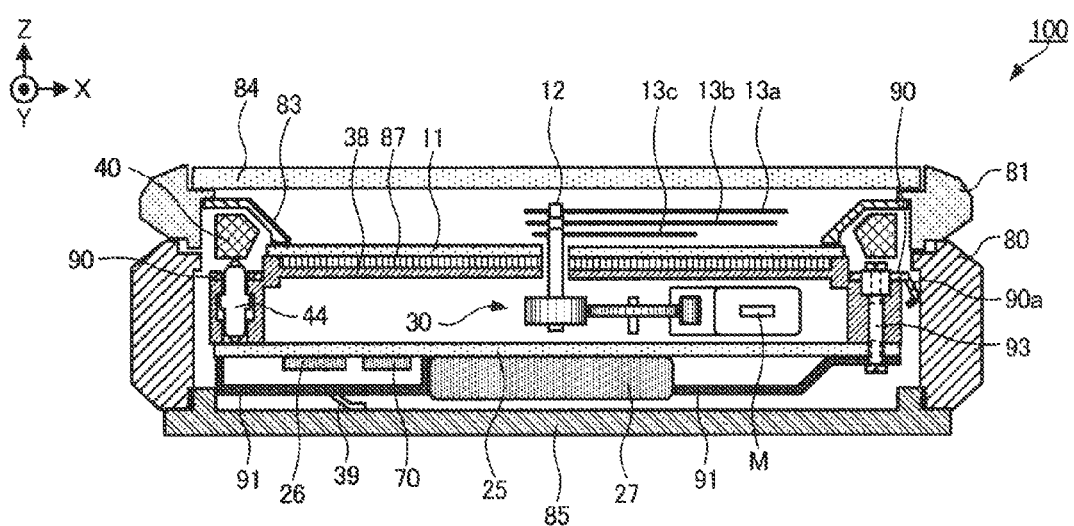
FIG. 3 is a section view showing main parts of the electronic timepiece.
Figure 4:
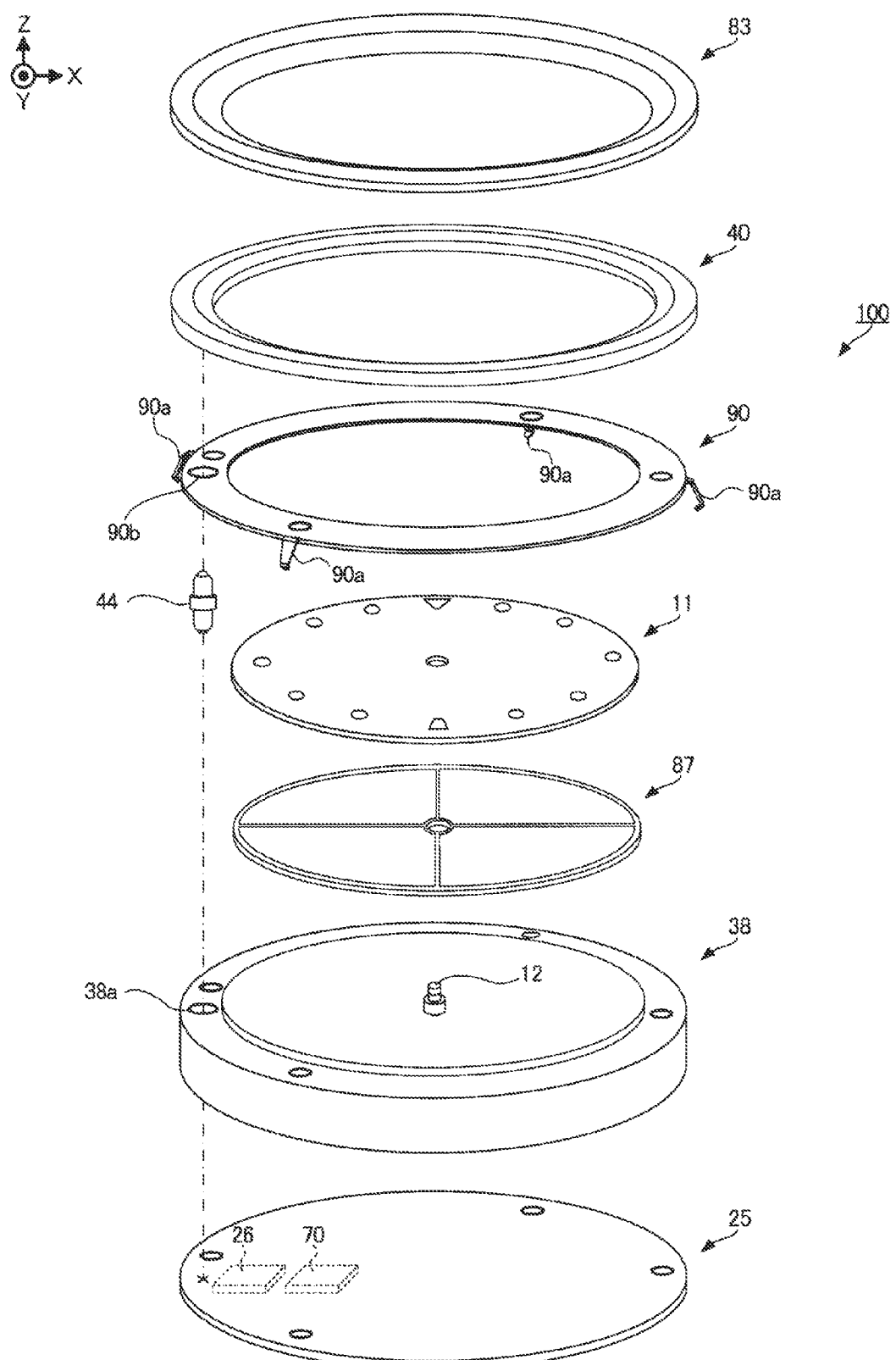
FIG. 4 is an exploded oblique view of main parts of the electronic timepiece.

FIG. 3 is a section view showing main parts of the electronic timepiece 100, and FIG. 4 is an exploded oblique view showing parts of the electronic timepiece 100.

As shown in FIG. 3, the annular bezel 81 is fit to the top (face side) of the cylindrical case 80, and the top opening of the bezel 81 is covered by the round crystal 84. The opening on the bottom (back side) of the case 80 is covered by a back cover 85 made of stainless steel, titanium, or other conductive material. the case 80 and back cover 85 screw together, for example. The outside case of the electronic timepiece 100 thus includes the case 80, bezel 81, crystal 84, and back cover 85.

The annular dial ring 83 is disposed to the inside circumference of the bezel 81 below the crystal 84. The outside circumference side of the dial ring 83 is flat and contacts the inside surface of the bezel 81, and the inside circumference side is beveled and slopes to the inside. A donut-shaped storage space is formed below the dial ring 83, and the annular antenna 40 is housed in this space.

The antenna 40 is disposed on the inside side of the inside circumference of the case 80 and bezel 81, and the top of the antenna 40 is covered by the dial ring 83.

An annular ground plane 90 made of metal or other conductive material is disposed below the antenna 40. As shown in FIG. 4, four holes are formed in the ground plane 90 in addition to a through-hole 90*b* for the feed pin 44, and a conductive pin 93 as shown in FIG. 3 is disposed in each of these four holes. Four holes for passing conductive pins 93 are also formed in the main plate 38 and the edge of the circuit board 25 matching the holes in the ground plane 90. See FIG. 4.

The ground potential of the circuit block including a GPS reception unit 26 and control unit 70 is supplied through the circuit board 25 to the conductive pins 93, and the ground potential of the four conductive pins 93 is supplied to the ground plane 90. Four conductive springs 90*a* are also disposed to the ground plane 90 as shown in FIG. 4. Part of each conductive spring 90*a* contacts the inside surface of the case 80 with the urging force of the spring (see FIG. 3), and the conductive springs 90*a* are thereby electrically connected to the case 80. The ground potential is therefore also supplied through the ground plane 90 (conductive springs 90*a*) to the case 80.

The dial 11 and solar panel 87 are disposed inside the antenna 40. The dial 11 is made of plastic or other optically transparent non-conductive material.

The solar panel 87 is a round disc having plural solar cells (photovoltaic devices) that convert light energy to electrical energy (power) connected in series. The dial 11 and solar panel 87 are superimposed with each other and have a center hole through which the center pivot 12 passes.

The main plate 38 made of plastic, ceramic, or other non-conductive material is disposed below the solar panel 87. The center pivot 12 extends through the solar panel 87 and main plate 38 in the thickness direction between the face and back. The center pivot 12 is the center of the electronic timepiece 100 when the electronic timepiece 100 is seen from the direction perpendicular to the dial 11 (that is, when the electronic timepiece 100 is seen in plan view). The hands 13 (13*a* to 13*c*) are disposed between the crystal 84 and the dial 11 inside the inside circumference of the antenna 40 as shown in FIG. 3.

A drive mechanism 30 that causes the center pivot 12 to turn and drives the hands 13 is disposed below the main plate 38 as shown in FIG. 3. The drive mechanism 30 includes a stepper motor M and wheel train, and drives the hands 13 by the stepper motor M causing the center pivot 12 to turn through the wheel train. For example, the hour hand 13*c* turns one revolution in 12 hours, the minute hand 13*b* turns one revolution in 60 minutes, and the second hand 13*a* turns one revolution in 60 seconds. The time display unit includes, for example, the dial 11, center pivot 12, hands 13 (13*a* to 13*c*), and the drive mechanism 30.

The circuit board 25 is disposed below the main plate 38 and drive mechanism 30. A circuit block including a GPS reception unit 26 and control unit 70 is disposed on the bottom (on the surface facing the back of the wristwatch) of the circuit board 25. The GPS reception unit 26 is a single-chip IC module, for example, and includes analog and digital circuits. The control unit 70 controls the operation of the GPS reception unit 26 and drive mechanism 30. A storage battery 27 is disposed on the bottom of the circuit board 25 (FIG. 3). The storage battery 27 in this embodiment is a lithium ion battery, and is charged by the power produced by the solar panel 87.

The GPS reception unit 26 and control unit 70 are covered by a shield 91 made of metal or other conductive material as shown in FIG. 3. The ground potential is supplied to the shield 91, and the ground potential is further supplied through the shield 91 and a metal circuit support 39 to the back cover 85 and case 80. The ground potential is also supplied through the circuit board 25 and conductive pins 93 to the ground plane 90 and case 80.

The members constituting the ground potential supply path (such as the shield 91, circuit support 39, back cover 85, conductive pin 93, ground plane 90, and conductive springs 90*a*) are processed with gold plating or anticorrosion coating on the contact surfaces between the members. The conductive pins 93 are screwed tight. Contact resistance between the members of the ground potential supply path can therefore be held as low as possible for a long time.

A wiring pattern for supplying the ground potential, and a wiring pattern for supplying a specific potential to feed the antenna 40, are formed on the circuit board 25. The feed pin 44 is a pin connector made of metal or other conductive material, and has an internal coil spring. As shown in FIG. 4, the feed pin 44 is electrically connected through through-holes 38*a*, 90*b* in the main plate 38 and ground plane 90 to the top of the circuit board 25 and the bottom of the antenna 40. The top end of the feed pin 44 contacts the bottom of the antenna 40 (more specifically, the feed part 404 described below) due to the urging force of the coil spring. The bottom of the feed pin 44 likewise contacts the top of the circuit board 25 (more specifically, the part where the wiring pattern supplying a specific potential is formed) due to the urging force of the coil spring. A specific potential is fed to the antenna 40 through the feed pin 44.

Figure 5A:
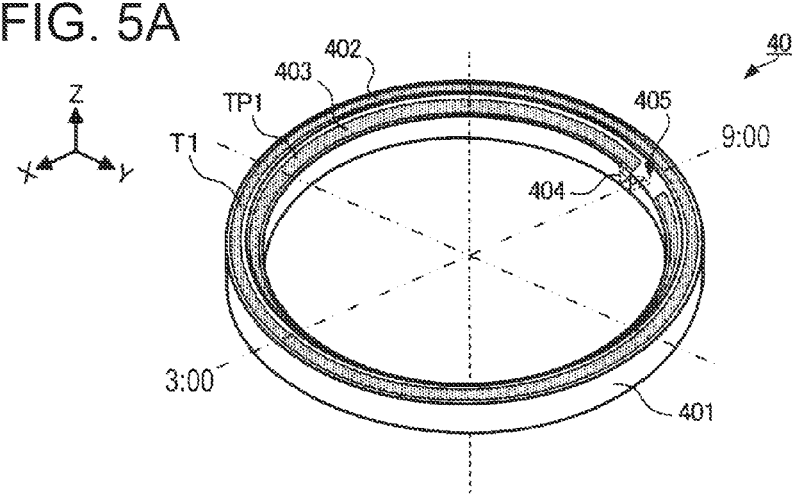
FIG. 5A to FIG. 5C describe the structure of the antenna.
Figure 5B:
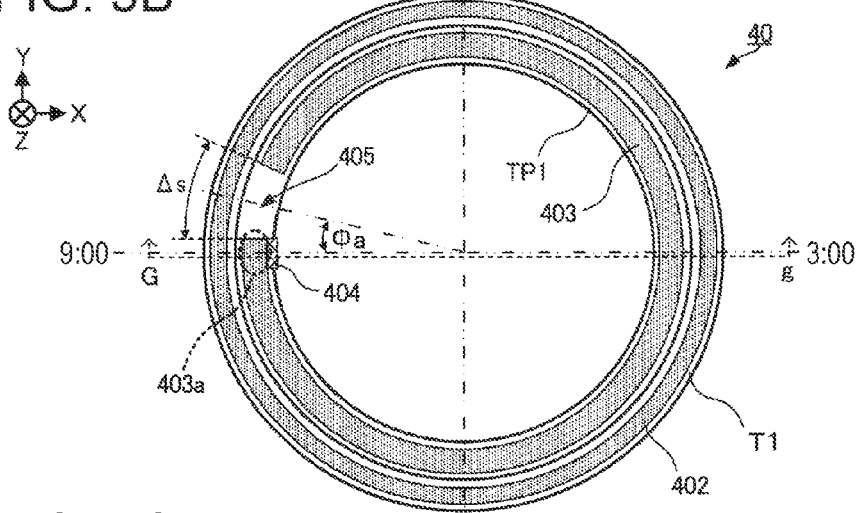
Figure 5C:
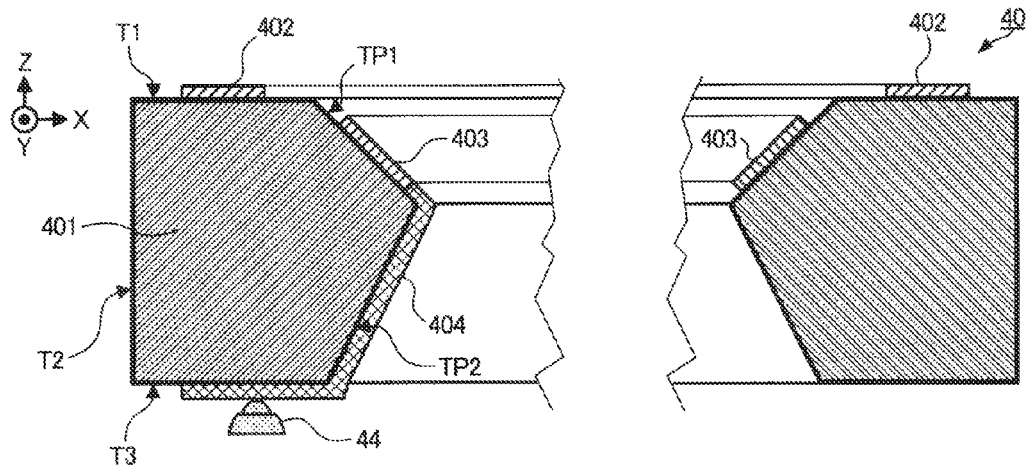

FIG. 5A to FIG. 5C describe the construction of the antenna 40.

FIG. 5A is an oblique view of the antenna 40, FIG. 5B is a plan view of the antenna 40, and FIG. 5C is a section view of the antenna 40 through line G-g in FIG. 5B.

The antenna 40 includes an annular base 401 made of plastic, ceramic, or other dielectric material, a parasitic element 402 formed on the surface of the base 401, a driven element 403, and a feed part 404. The parasitic element 402, driven element 403, and feed part 404 are each made of metal or other conductive material, and can be formed by a plating or silver paste printing process. The dielectric constant of the base 401 material can be adjusted to approximately 5-20 by mixing a dielectric material that is used in high frequency applications, such as titanium oxide, with resin.

As shown in FIG. 5C, the base 401 has a pentagonal section including a top T1, outside face T2, bottom T3, slope TP1, and slope TP2. The parasitic element 402 is formed on the top T1, and the driven element 403 is formed on slope TP1. The feed part 404 is formed on the slope TP1, slope TP2, and bottom T3. The end of the feed part 404 on the slope TP1 side connects to the driven element 403, and the top of the feed pin 44 contacts the end of the feed part 404 on the bottom T3. A specific potential is therefore supplied through the feed pin 44 and feed part 404 to the driven element 403. Potential from an external source is not supplied to the parasitic element 402.

As shown in FIG. 5A and FIG. 5B, the parasitic element 402 is annular, that is, is formed in an endless O-shape. The driven element 403, however, has a notch 405, and is therefore C-shaped with part of the ring missing. The driven element 403 has an antenna length that resonates to signals (satellite signals) from a GPS satellite 20. For example, if the angle between the feed part 404 and notch 405 is •a, the length of the notch 405 is ⓧs, the circumferential length of the driven element 403 is L, and the free space wavelength of the received circularly polarized waves is •, then L=1.31•, •a=40°, and •s=0.018•.

The feed part 404 is connected to an end of the C-shaped driven element 403. As shown in FIG. 5B, the part (end) of the driven element 403 to which the feed part 404 is connected is a feed position 403*a* to which a specific potential is supplied. The feed position 403*a* is disposed at approximately 9:00 on the electronic timepiece 100. More specifically, when the electronic timepiece 100 is seen in plan view, the feed position 403*a*, feed part 404, and feed pin 44 are disposed at approximately 9:00 relative to the center (center pivot 12) of the electronic timepiece 100.

As shown in FIG. 5A and FIG. 5B, the parasitic element 402 and driven element 403 are disposed with a specific gap therebetween, and when current flows to the driven element 403, current is induced in the parasitic element 402. That is, the distance between the parasitic element 402 and driven element 403 is a distance enabling electromagnetic coupling therebetween. The driven element 403 and parasitic element 402 therefore couple electromagnetically, and together function as an antenna element that converts electromagnetic waves to current. Because the parasitic element 402 is O-shaped, the antenna 40 overall functions as an O-shaped loop antenna. The driven element 403 to which a specific potential is supplied and the ground plane 90 to which ground potential is supplied therefore resonate, and the electronic timepiece 100 can receive radio waves (satellite signals) from a GPS satellite 20 by this resonance.

Because GPS satellites 20 transmit satellite signals at 1.575 GHz, the length of one wave is approximately 19 cm. Because an antenna length of approximately 1.0-1.2 wavelength is required to receive circularly polarized waves, a loop antenna of approximately 19-24 cm is required to receive a GPS signal. Rendering a loop antenna with this antenna length in a wristwatch, however, results in a large wristwatch.

For example, if the dielectric constant is •r and a base 401 with a dielectric constant of Σr is used, the wavelength shortening rate of the base 401 will be 1/√Σr. More specifically, the wavelength of the radio waves to be received by the antenna 40 can be shortened 1/√Σr times by using a dielectric with a dielectric constant of •r. Because the dielectric constant •r of the base 401 is approximately 5-20 as described above, the antenna length of the antenna 40 can be shortened approximately 0.224 (•r=20) to 0.447 (•r=5) times compared with a configuration not using the base 401.

The resonance frequency of the antenna 40 can also be reduced and the impedance characteristic can be improved by electromagnetically coupling the parasitic element 402 to the driven element 403. Return loss at the resonance frequency can therefore be reduced, and the satellite signal reception performance of the antenna 40 can be increased by adjusting the resonance frequency of the antenna 40 to the satellite signal.

Note that contact resistance can be kept low for a long time and a drop in the reception performance of the antenna 40 can be prevented by also applying gold plating or anticorrosion coating process to the contact surfaces of the feed pin 44 and feed part 404, and the contact surfaces of the feed pin 44 and circuit board 25.

Figure 6:
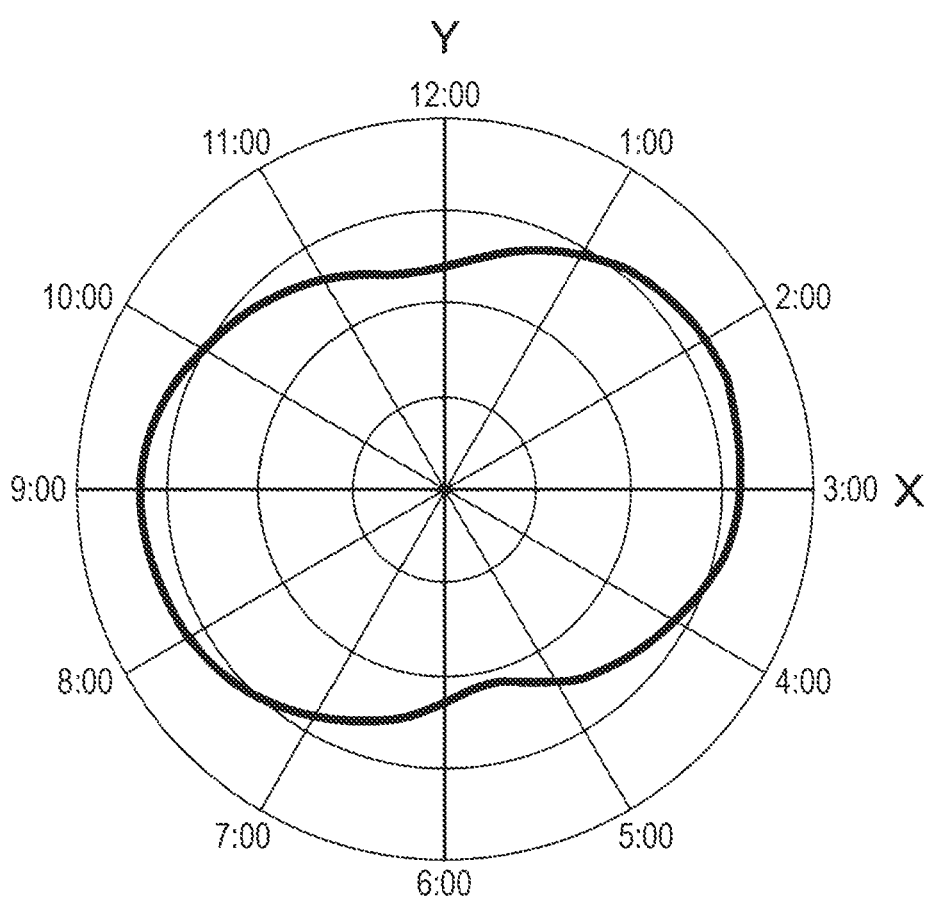
FIG. 6 is a graph showing the radiation pattern in the x-y plane of the antenna.

FIG. 6 is a graph showing the radiation pattern in the x-y plane of the antenna 40.

As will also be known from FIG. 2 to FIG. 5, the x-axis is the direction from the center (center pivot 12) to 3:00 when the electronic timepiece 100 is seen in plane view. The y-axis is the direction from the center to 12:00 when the electronic timepiece 100 is seen in plan view. As also described above, the feed position 403a is disposed in the direction of 9:00 from the center when the electronic timepiece 100 is seen in plan view. The direction of maximum radiation in the x-y plane of the antenna 40 substantially matches this as shown in FIG. 6. More specifically, the direction of maximum radiation in the x-y plane of the antenna 40 is in the direction between 8:00 and 9:00, and the opposite direction, as shown in FIG. 6.

Figure 7:
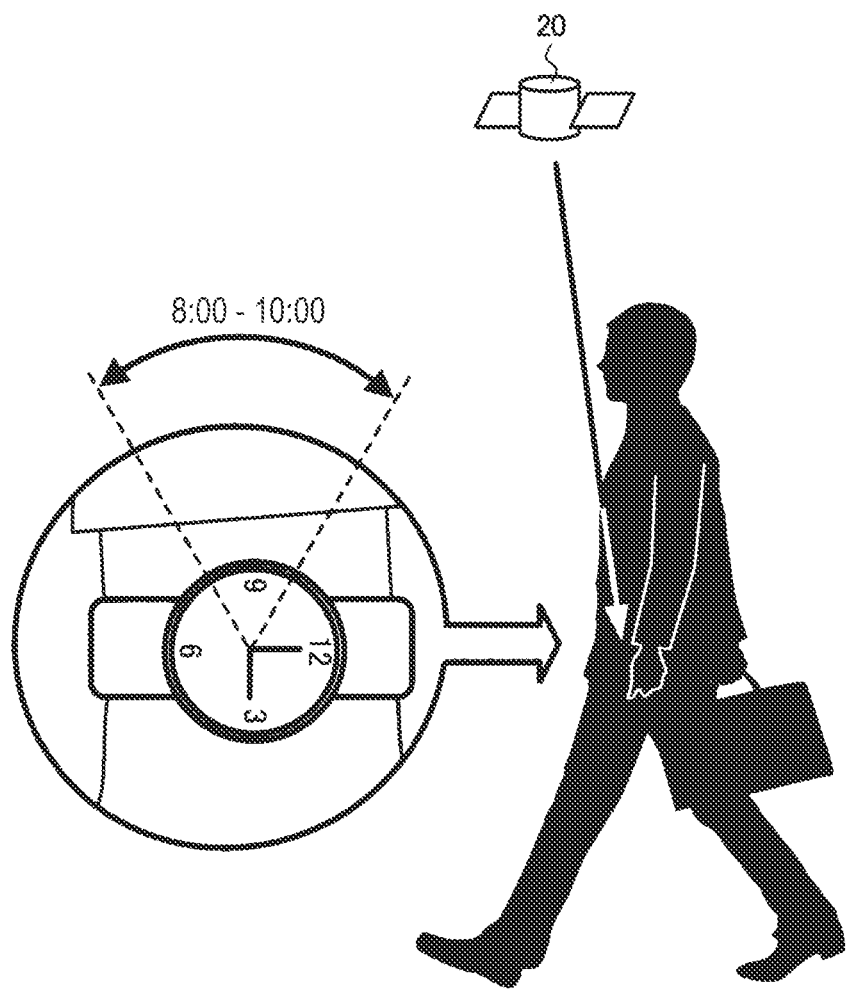
FIG. 7 shows wearing the electronic timepiece outdoors.

The electronic timepiece 100 receives satellite signals when the user is outdoors, but when the user is outdoors, the arm on which the electronic timepiece 100 is worn is often hanging down at the side as shown in FIG. 7 or in front of the body. In this posture, the direction from the center to 9:00 on the electronic timepiece 100 is pointing generally toward the zenith as shown in FIG. 7. The probability that the direction of maximum radiation of the antenna 40 is towards the zenith when the user is outdoors can therefore be increased by disposing the feed position 403a (the location of the feed part 404 and feed pin 44) in the vicinity of 9:00 from the center of the electronic timepiece 100.

Because the feed pin 44 and feed part 404 are electrically connected to the driven element 403 and the same potential as the driven element 403, they function as part of the loop antenna.

The crown 16 and pushers 17, 18 are also disposed in the area from 2:00 to 4:00 of the electronic timepiece 100 as shown in FIG. 2. The crown 16 and pushers 17, 18 are made of metal or other conductive material. The crown stem (not shown in the figure), which is made of metal or other conductive material, also extends from the crown 16 through the case 80 toward the center of the electronic timepiece 100. Stems (not shown in the figure) made of metal or other conductive material also extend from the pushers 17, 18 through the case 80 toward the center of the electronic timepiece 100. If the feed pin 44 and feed part 404 are disposed near the crown 16, pushers 17, 18, and stems thereof ("operating members" below), resonance occurs because these members are all made of conductive materials, the current density near the antenna 40 will change, and the reception performance of the antenna 40 will drop.

The feed pin 44 and feed part 404 must therefore be disposed near the operating members in order to maintain good reception performance in the antenna 40. Tests demonstrated that when the crown 16 and pushers 17, 18 are disposed in the area from 2:00 to 4:00 as shown in FIG. 2, good reception performance can be maintained in the antenna 40 if the feed pin 44 and feed part 404 are in the angular range from 5:00 to 1:00 (more specifically, the range from 5:00 through 9:00 to 1:00). More specifically, to maintain good reception performance in the antenna 40 considering the operating members, the feed position 403a (the location of the feed part 404 and feed pin 44) must be in the angular range from approximately 5:00 to approximately 1:00 relative to the center of the electronic timepiece 100.

The antenna 40 receives satellite signals by resonating with the ground plane 90, but conductive members other than the ground plane 90 that are near the antenna 40 include the case 80, and the antenna 40 also resonates with the case 80. As shown in FIG. 2, lugs 80a made of a conductive material are disposed to the part of the case 80 from 11:00 to 1:00 and the part from 5:00 to 7:00. These parts protrude further to the outside and the volume is significantly greater than other parts. If the feed pin 44 and feed part 404 are disposed near the lugs 80a, the reception performance of the antenna 40 drops due to loss from the lugs 80a.

Therefore, to maintain good reception performance in the antenna 40, the feed pin 44 and feed part 404 must not be disposed near the lugs 80a. Tests demonstrated that when the lugs 80a are disposed to the part of the case 80 from 11:00 to 1:00 and the part from 5:00 to 7:00 as shown in FIG. 2, the reception performance of the antenna 40 can be sufficiently maintained if the feed pin 44 and feed part 404 are disposed in the area from 2:00 to 4:00 or the area from 8:00 to 10:00. More specifically, to maintain good reception performance in the antenna 40 considering the lugs 80a, the feed position 403a (the location of the feed part 404 and feed pin 44) must be in the angular range from approximately 2:00 to approximately 4:00 or the range from approximately 8:00 to approximately 10:00 relative to the center of the electronic timepiece 100.

Figure 8:
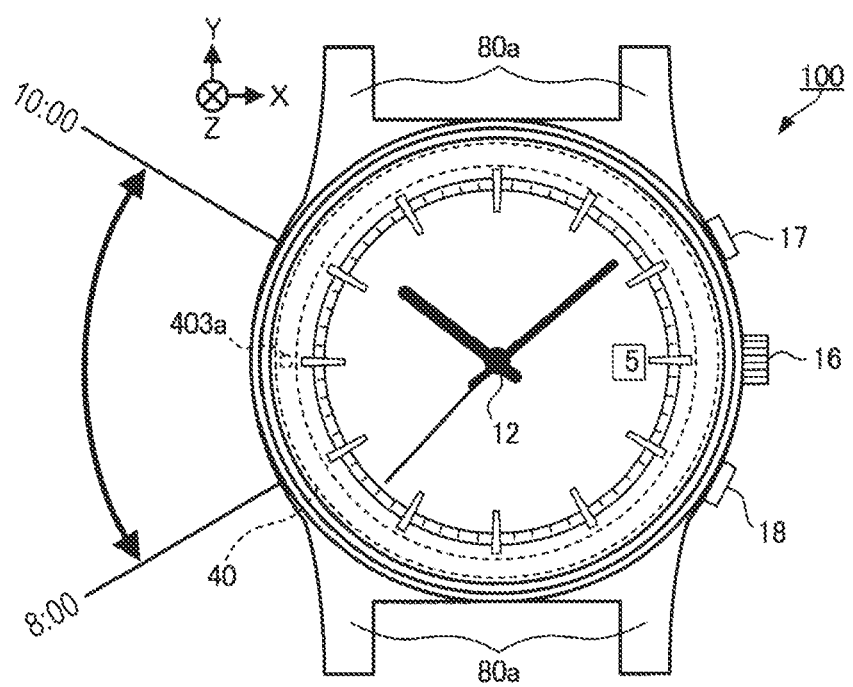
FIG. 8 shows the range in which the feed position is located.

Based on the foregoing, the feed position 403a must be in the angular range from approximately 8:00 to approximately 10:00 from the center (center pivot 12) of the electronic timepiece 100 as shown in FIG. 8 in order to increase the probability that the direction of maximum radiation of the antenna 40 will be toward the zenith when the user is outdoors and maintain good reception performance in the antenna 40 considering both the operating members and lugs 80a. The location of the feed pin 44 and feed part 404 is therefore not limited to approximately 9:00 from the center of the electronic timepiece 100, and can be in the range from approximately 8:00 to approximately 10:00.

Figure 9:
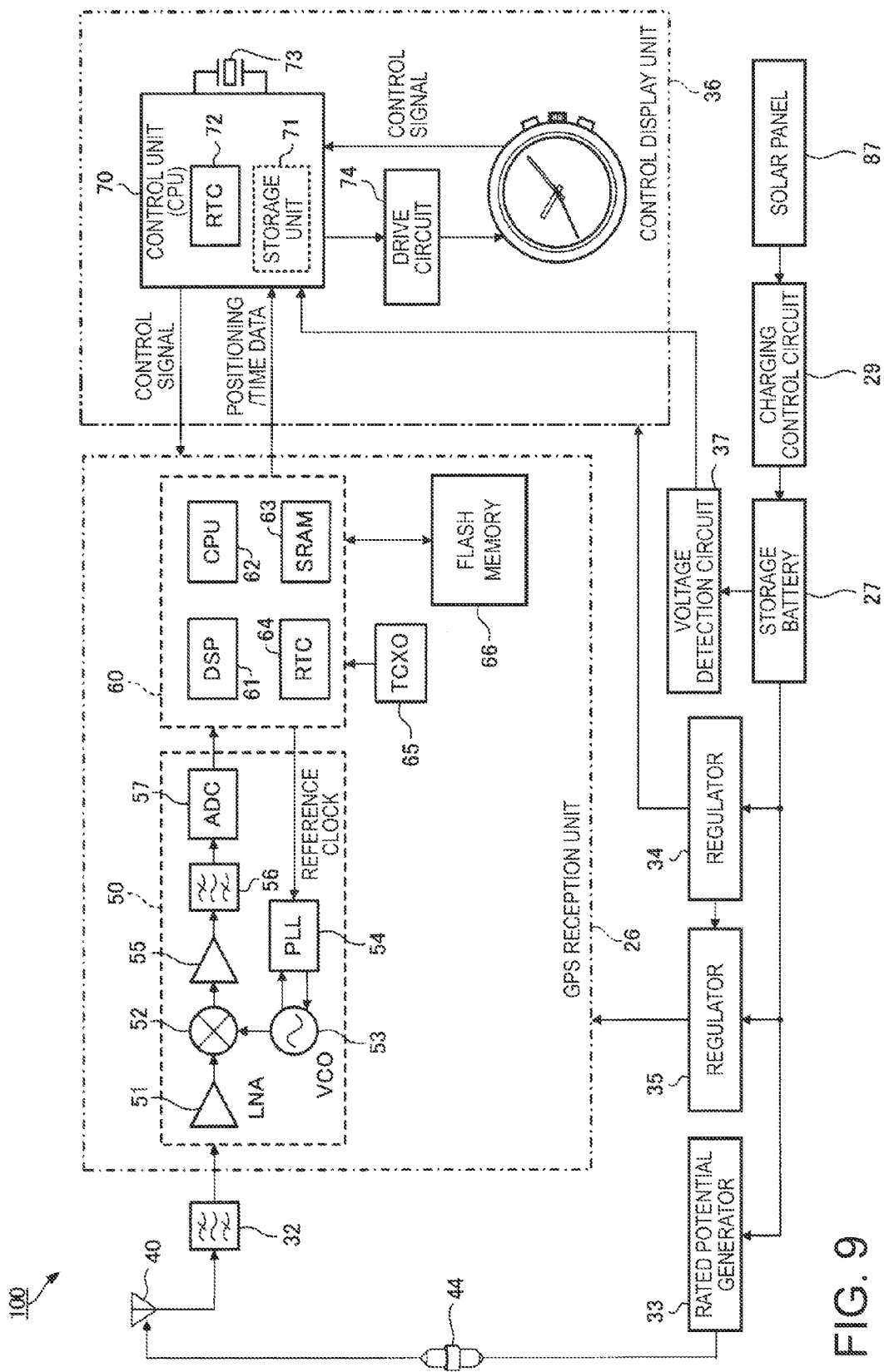
FIG. 9 is a block diagram showing the circuits of the electronic timepiece.

FIG. 9 is a block diagram showing the circuit configuration of the electronic timepiece 100.

The electronic timepiece 100 includes a GPS reception unit 26 and a control display unit 36. The GPS reception unit 26 executes processes related to receiving satellite signals, locking onto GPS satellites 20, generating positioning information, and generating time adjustment information, for example. The control display unit 36 executes processes including keeping and adjusting the internal time, and movement of the hands 13.

A solar panel 87 charges the storage battery 27 through the charging control circuit 29. The storage battery 27 supplies drive power through a regulator 34 to the control display unit 36, and supplies drive power through another regulator 35 to the GPS reception unit 26. A voltage detection circuit 37 detects the voltage of the storage battery 27 and outputs to a control unit 70.

Regulator 35 could be split into a regulator that supplies drive power to the RF (radio frequency) unit 50, and a regulator that supplies drive power to a baseband unit 60. In this case, the regulator that supplies power to the RF unit 50 could be disposed in the RF unit 50.

A rated potential generator 33 generates a specific potential with a predetermined potential difference to the ground pot. The specific potential generated by the rated potential generator 33 is supplied through the circuit board 25 and feed pin 44 to the antenna 40 (driven element 403).

The antenna 40 receives satellite signals from GPS satellites 20. However, because some extraneous signals other than the desired satellite signals are also received, a SAW (surface acoustic wave) filter 32 is disposed after the antenna 40. The SAW filter 32 functions as a bandpass filter that passes signals in the 1.5 GHz waveband, and extracts the satellite signal from the signals received by the antenna 40.

The GPS reception unit 26 includes the RF unit 50 and baseband unit 60. The RF unit 50 includes a LNA (low noise amplifier) 51, mixer 52, VCO (voltage controlled oscillator) 53, PLL (phase-locked loop) circuit 54, IF (intermediate frequency) amplifier 55, IF filter 56, and A/D converter 57.

Signals (satellite signals) passed by the SAW filter 32 are input to the RF unit 50 and amplified by the LNA 51. The satellite signal amplified by the LNA 51 is mixed by the mixer 52 with the clock signal output by the VCO 53, and down-converted to a signal in the intermediate frequency band. The PLL circuit 54 phase compares a clock signal obtained by frequency dividing the output clock signal of the VCO 53 with a reference clock signal supplied from the baseband unit 60, and synchronizes the output clock signal of the VCO 53 to the reference clock signal. As a result, the VCO 53 can output a stable clock signal with high frequency precision. Note that several megahertz, for example, can be selected as the intermediate frequency.

The signal in the IF band output from the mixer 52 is amplified by the IF amplifier 55. However, because mixing by the mixer 52 produces a high frequency component of several GHz, the IF amplifier 55 amplifies both the IF signal and the high frequency component of several GHz. As a result, the IF filter 56 extracts the IF signal and removes the high frequency component (more accurately, attenuates the signal to a specific level or less). The IF signal passed by the IF filter 56 is converted to a digital signal by the A/D converter 57.

The baseband unit 60 includes, for example, a DSP (digital signal processor) 61, CPU (central processing unit) 62, SRAM (static random access memory) 63, and RTC (real-time clock) 64. A TCXO (temperature compensated crystal oscillator) 65 and flash memory 66 are also connected to the baseband unit 60.

The TCXO 65 generates a reference clock signal of a substantially constant frequency regardless of temperature. Operation of the baseband unit 60 is synchronized to the reference clock signal output by the TCXO 65. The RTC 64 generates the timing for satellite signal processing, and counts up at the reference clock signal output from the TCXO 65.

Time zone information, for example, is stored in flash memory 66. The time zone information defines the time difference to UTC related to known coordinates (such as latitude and longitude).

The baseband unit 60 executes a process that demodulates the baseband signal from the digital signal (IF signal) output from the A/D converter 57 of the RF unit 50 when the time information acquisition mode or the positioning information acquisition mode is set.

In addition, when the time information acquisition mode or the positioning information acquisition mode is set, the baseband unit 60 executes a process that generates a local code of the same pattern as each C/A code, and correlates the local codes to the C/A code contained in the baseband signal, in the satellite search step. The baseband unit 60 adjusts the timing when the local code is generated to find the peak correlation to each local code, and when the correlation equals or exceeds a threshold value, determines that the local code synchronized with the GPS satellite 20 (that is, locked onto a GPS satellite 20). Note that the GPS system uses a CDMA (Code Division Multiple Access) method whereby all GPS satellites 20 transmit satellite signals on the same frequency using different C/A codes. The GPS satellites 20 that can be locked onto can therefore be found by identifying the C/A code contained in the received satellite signal.

To acquire the navigation message from the satellite signal of the GPS satellite 20 that was locked onto, the baseband unit 60 also executes a process that mixes the baseband signal with the local code of the same pattern as the C/A code of the GPS satellite 20 that was locked. The navigation message from the GPS satellite 20 that was locked onto is thereby demodulated. The baseband unit 60 then executes a process to detect the TLM word (preamble data) of each subframe in the navigation message, and acquire and store in SRAM 63 satellite information such as the orbit information and GPS time information contained in each subframe. The GPS time information as used here is the week number (WN) and Z count, but the Z count data alone could be acquired if the week number was previously acquired.

The baseband unit 60 then generates the time adjustment information based on the satellite information. The time adjustment information is information for correcting the internal time kept by the electronic timepiece 100.

In the time information acquisition mode, the baseband unit 60 can generate the time adjustment information using the GPS time information, time adjustment parameter, or UTC offset contained in the satellite information from one GPS satellite 20, for example. The baseband unit 60 can also generate the time adjustment information from satellite information from a plurality of GPS satellites 20. The time adjustment information in the time information acquisition mode could be, for example, the GPS time information itself, the GPS time information after being corrected based on the time adjustment parameter, or time information acquired by adding the time adjustment parameter or UTC offset to the GPS time information. Further alternatively, information indicating the difference between this time information and the internal time of the electronic timepiece 100 could be used as the time adjustment information.

However, in the positioning information acquisition mode, the baseband unit 60 receives satellite information from at least three (and normally four) or more GPS satellites 20, and acquires the location of the electronic timepiece 100 using the received satellite information. Next, the baseband unit 60 references the time difference information stored in flash memory 66, and acquires the time difference at the acquired location. The baseband unit 60 then adds the acquired time difference to the time adjustment information generated using the same method used in the time information acquisition mode. The time adjustment information used in the positioning information acquisition mode therefore reflects the time difference at the current location of the electronic timepiece 100.

The control display unit 36 includes a control unit 70, crystal oscillator 73, and drive circuit 74.

The control unit 70 can be rendered by a configuration including a storage unit 71 and a CPU with a RTC (real-time clock) 72.

The control unit 70 outputs control signals to the GPS reception unit 26, and controls operation of the GPS reception unit 26. The control unit 70 also controls movement of the hands 13 (13a to 13c) through the drive circuit 74. The control unit 70 also controls operation of regulators 34, 35 and the rated potential generator 33 based on output from the voltage detection circuit 37.

The time adjustment information and positioning information output from the GPS reception unit 26 are stored in the storage unit 71. The RTC 72 keeps the internal time. The RTC 72 operates continuously, and counts up at the reference clock signal generated by the crystal oscillator 73. The control unit 70 can therefore continue moving the hands 13 based on the internal time kept by the RTC 72 whether the time information acquisition mode or the positioning information acquisition mode is set.

When time adjustment information is output from the GPS reception unit 26 in the time information acquisition mode or the positioning information acquisition mode, the control unit 70 corrects the internal time kept by the RTC 72 according to the time adjustment information. When the internal time is corrected, the control unit 70 also drives the hands 13 through the drive circuit 74 so that the hands 13 (13a to 13c) indicate the internal time after being corrected. As a result, the internal time of the electronic timepiece 100 is set to the correct time. In the positioning information acquisition mode, the internal time can also be adjusted to the correct time reflecting the time difference (time zone) at the current location of the electronic timepiece 100.

As described above, this embodiment of the invention has a C-shaped driven element 403 to which a specific potential is supplied and an O-shaped parasitic element 402 disposed in parallel with a specific gap therebetween on an annular base 401 (dielectric) forming the body of the antenna 40. When current flows to the driven element 403, current is also induced in the parasitic element 402, the driven element 403 and parasitic element 402 electromagnetically couple, and together function as an antenna element that converts electromagnetic waves to current. The antenna 40 overall functions as an O-shaped loop antenna. The radiant directivity in the loop plane (x-y plane) of this loop antenna is greatest in or near the direction of the feed position 403a (where the feed pin 44 and feed part 404 are disposed) from the center of the loop.

Therefore, by disposing the feed position 403a in the direction of approximately 8:00 to approximately 10:00 from the center (center pivot 12) of the electronic timepiece 100 in plan view, the direction of maximum radiation of the antenna 40 faces the zenith when the user's arm on which the electronic timepiece 100 is worn is hanging down at the side or in front of the body as shown in FIG. 7, and sufficiently good reception performance can be obtained with the antenna 40. The antenna according to this embodiment of the invention therefore provides the optimal practical antenna directivity based on the frequent posture of the user when outdoors.

Furthermore, because the antenna 40 has an annular base 401 (dielectric), the circumference length of the antenna 40 can be shortened using the wavelength shortening effect of the dielectric, and the size of the antenna 40 can therefore be reduced.

By electromagnetically coupling the parasitic element 402 and driven element 403, this embodiment of the invention can also reduce the resonance frequency of the antenna 40 and improve the impedance characteristic. Return loss at the resonance frequency can therefore be reduced, and the satellite signal reception performance of the antenna 40 can be increased by tuning the resonance frequency of the antenna 40 to the satellite signal.

The invention thus enables reducing the size of the antenna 40 while maintaining sufficient reception performance.

The driven element 403 is disposed on the inside of the parasitic element 402 in this embodiment relative to the center axis of the the base 401 of the antenna 40 (FIG. 5B). Because the area near the antenna 40 has high current density and is sensitive to external factors, the reception performance of the antenna 40 becomes unstable when the case 80 is touched with a finger if the case 80 member rendering the side of the outside case is made of metal or other conductive material. By disposing the driven element 403 on the inside of the parasitic element 402, the distance from the case 80 to the driven element 403 can be increased compared with a configuration having the driven element 403 on the outside of the parasitic element 402, and the reception performance of the antenna 40 can be stabilized.

The annular base 401 of the antenna 40 in this embodiment has a flat top T1 located on the outside circumference side, a slope TP1 that is located on the inside circumference side and formed so that the height to the dial 11 decreases as the slope TP1 descends to the inside, and the driven element 403 is disposed to this slope TP1. Because the distance from the case 80 to the driven element 403 can be increased with this configuration, the reception performance of the antenna 40 can be stabilized.

Furthermore, because the height to the dial 11 decreases as the slope TP1 descends to the inside, the dial 11 can be read from a wide angle direction. Furthermore, because the range of angles from which radio waves can be received is increased by disposing the driven element 403 to this slope TP1, good reception performance can be assured in the antenna 40. Providing this slope TP1 also makes the electronic timepiece 100 appear thinner, and improves the appearance.

The invention is not limited to the foregoing embodiment, and can be varied in many ways such as described in the following variations. Two or more of the variations described below can also be desirably combined.

Variation 1

In the antenna 40 shown in FIG. 5, the parasitic element 402 is not limited to an endless O-shape, and like the driven element 403 can be C-shaped with a notch. In this variation the entire antenna 40 functions as a C-shaped loop antenna. The feed position 403a in the antenna 40 shown in FIG. 5 is not limited to an end of the driven element 403, and can be disposed to a part of the driven element 403 other than an end.

The length of the driven element 403 in the foregoing embodiment is set to resonate to the satellite signal, but the length of the parasitic element 402 can be set to resonate to the satellite signal. By adjusting the length of the driven element 403 and the position of the notch 405, the impedance between the antenna 40 and the circuit (the circuit block including the GPS reception unit 26 and control unit 70) electrically connected to the antenna 40 can be easily matched.

Variation 2

Figure 10:
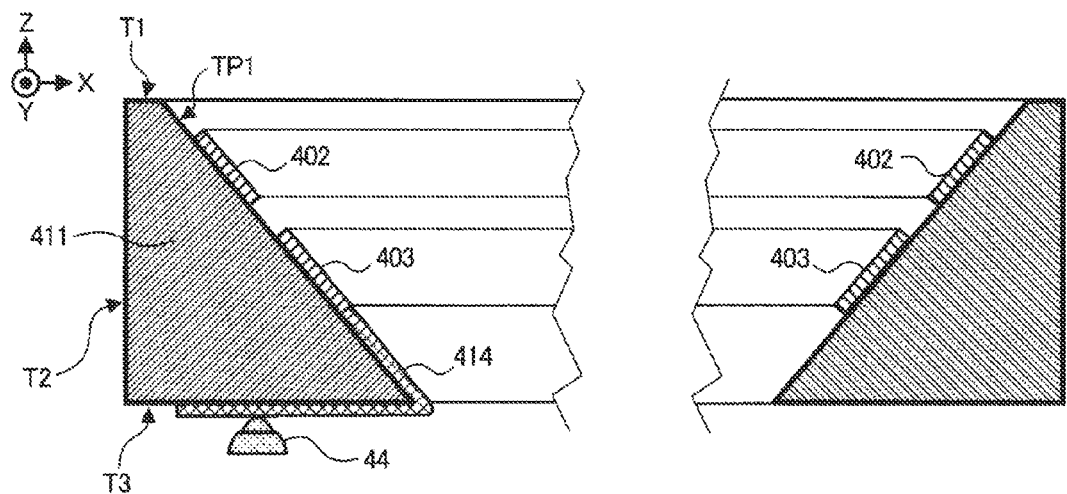
FIG. 10 is a section view of the antenna in variation 2 of the preferred embodiment.

FIG. 10 is a section view of the antenna in variation 2, and is the same as the view in FIG. 5C. The base 411 of the antenna in this variation does not have a slope TP2, and slope TP1 continues to the bottom T3. The top T1 of the base 411 is smaller and the slope TP1 is larger than the configuration shown in FIG. 5C. The parasitic element 402 is formed in addition to the driven element 403 on the slope TP1, and nothing is disposed to the top T1. Both the driven element 403 and parasitic element 402 can thus be disposed to slope TP1.

Variation 3

Figure 11:
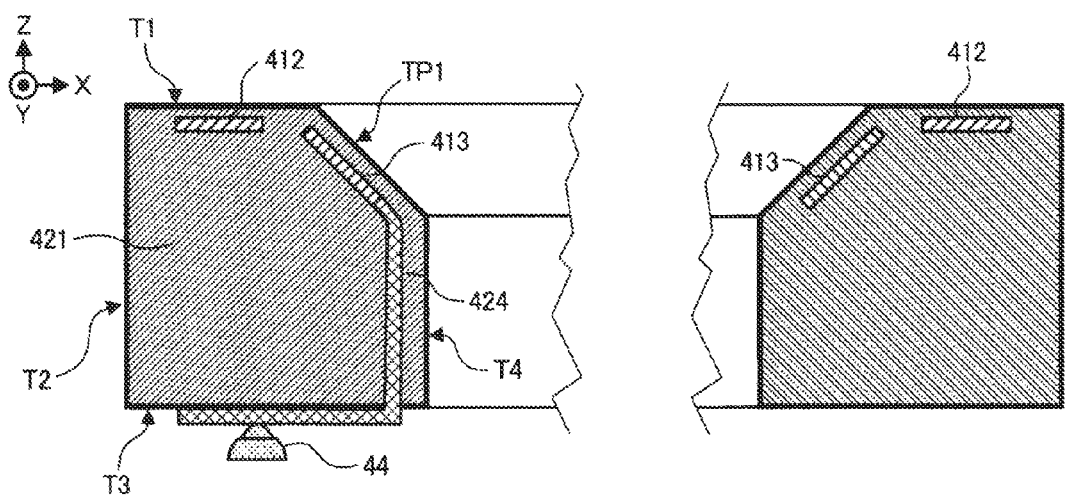
FIG. 11 is a section view of the antenna in variation 3 of the preferred embodiment.

FIG. 11 is a section view of the antenna in variation 3, and is the same as the view in FIG. 5C. The base 421 of the antenna in this variation has a vertical inside face T4 instead of a slope TP2. All of the parasitic element 412 and the driven element 413, and part of the feed part 424, are embedded in the base 421. This configuration can be manufactured by insert molding. Insert molding enables manufacturing the antenna at a lower cost than when the parasitic element 402, driven element 403, and feed part 404 are formed on the surface of the base 401 as shown in FIG. 5C by a plating or silver paste printing process.

Variation 4

Figure 12:
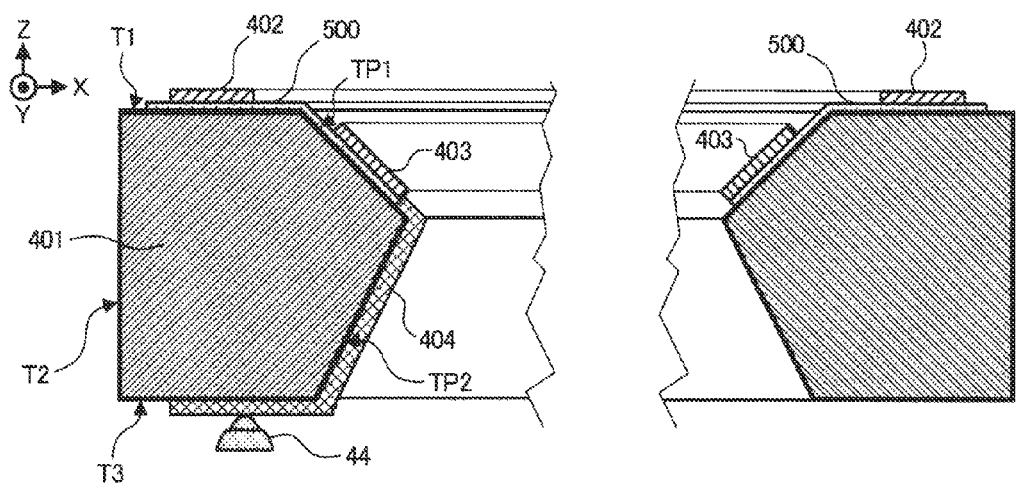
FIG. 12 is a section view of the antenna in variation 4 of the preferred embodiment.

FIG. 12 is a section view of the antenna in variation 4, and is the same as the view in FIG. 5C. As shown in the figure, the parasitic element 402 and driven element 403 are affixed to the base 401 by flexible tape 500. This configuration can be manufactured, for example, by forming the parasitic element 402 and driven element 403 on flexible tape 500, and affixing the flexible tape 500 to the surface of the base 401 (top T1 and slope TP1). This manufacturing method enables manufacturing the antenna at a lower cost than when the parasitic element 402 and driven element 403 are formed directly on the surface of the base 401 by a plating or silver paste printing process.

Further alternatively, the feed part 404 can also be affixed to the base 401 using the flexible tape 500.

Variation 5

Figure 13:
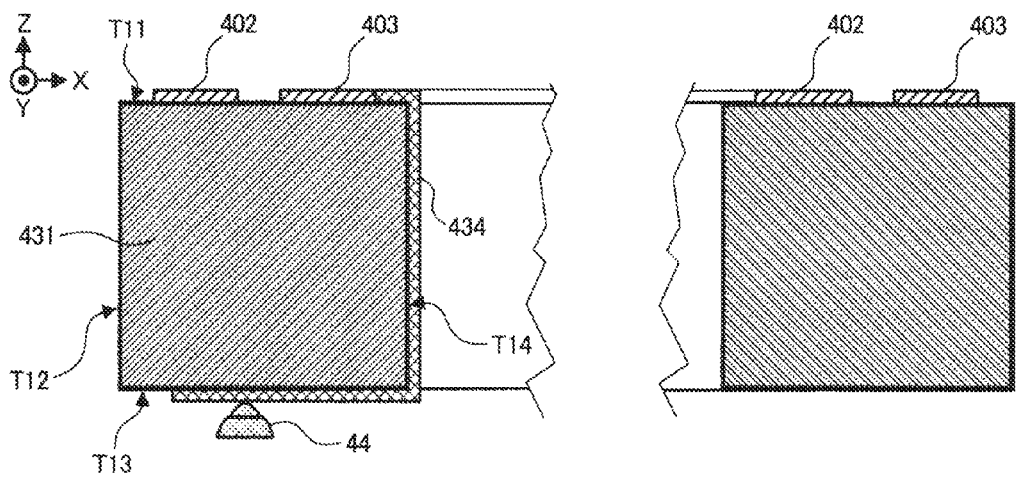
FIG. 13 is a section view of the antenna in variation 5 of the preferred embodiment.

FIG. 13 is a section view of the antenna in variation 5, and is the same as the view in FIG. 5C. The base 431 of the antenna in this variation is a rectangle in section with a top T11, outside face T12, bottom T13, and inside face T14. The parasitic element 402 and driven element 403 are formed on the top T11. The feed part 434 is formed on the top T11, inside face T14, and bottom T13. The base 431 in this configuration does not need to have a slope TP1. The locations of the parasitic element 402 and driven element 403 can also be reversed. More specifically, the driven element 403 can be on the outside of the parasitic element 402. In this implementation the feed part 434 is formed on the top T11, outside face T12, and bottom T13. If the feed part 434 is thus formed on the outside face T12, the case 80 is preferably made of a plastic, ceramic, or other non-conductive material.

Variation 6

The feed pin 44 and driven element 403 are electrically connected and at the same potential as the driven element 403, and therefore function as part of the loop antenna. Because the coil spring inside the feed pin 44 produces a magnetic field when current flows, and also picks up noise produced by the circuit elements and stepper motor M inside the electronic timepiece 100, reception performance of the antenna 40 drops due to the effects of this magnetic field and noise. To avoid this, the feed pin 44 can be configured as described below.

Figure 14:
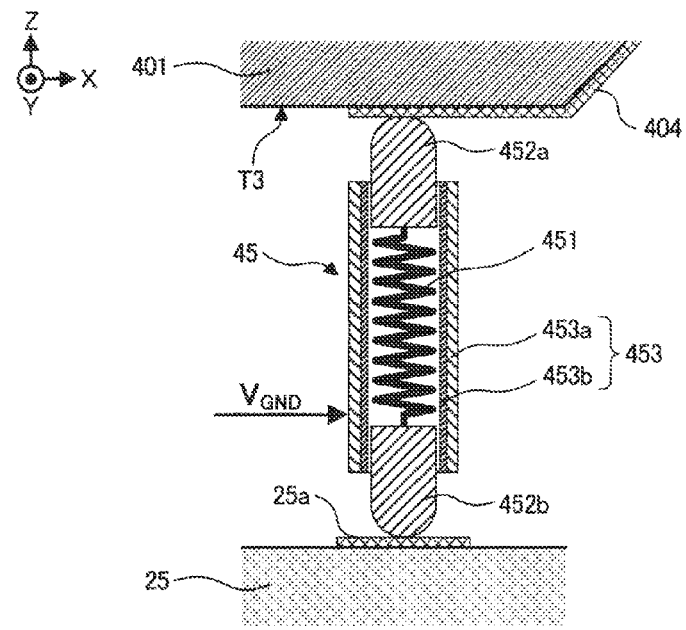
FIG. 14 is a section view of the feed pin in variation 6 of the preferred embodiment.

FIG. 14 is a section view of main parts of a feed pin 45 according to variation 6.

The feed pin 45 in this embodiment has a coil spring 451 made of metal or other conductive material. A contact 452a, 452b made of metal or other conductive material is connected to each end of the coil spring 451. One contact 452a contacts the feed part 404 formed on the bottom T3 of the base 401 due to the urging force of the coil spring 451, and connects electrically to the feed part 404. The other contact 452b contacts the wiring pattern 25a formed on the top of the circuit board 25 due to the urging force of the coil spring 451, and connects electrically to the wiring pattern 25a. A specific potential that feeds the driven element 403 is supplied to the wiring pattern 25a.

The feed pin 45 also has a cylindrical shield case 453. The shield case 453 includes an outside wall 453a made of metal or other conductive material, and an inside wall 453b made of plastic, ceramic, or other insulator. Ground potential $V_{GND}$ is supplied to the outside wall 453a.

Because the sides of the coil spring 451 are enclosed by the outside wall 453a to which ground potential $V_{GND}$ is supplied, the outside wall 453a functions as a magnetic shield. The outside wall 453a therefore suppresses change in the current density near the antenna 40 caused by the magnetic field produced by the coil spring 451, and the coil spring 451 picking up noise from circuits and the stepper motor M inside the electronic timepiece 100, and enables maintaining good reception performance in the antenna 40.

Note that a configuration in which the feed pin 45 does not have contacts 452a, 452b, one end of the coil spring 451 (the top end in the figure) directly contacts the feed part 404 disposed to the bottom T3 of the base 401, and the other end (the bottom end in the figure) of the coil spring 451 directly contacts the wiring pattern 25a formed on the top of the circuit board 25, is also conceivable.

Variation 7

Instead of using a feed pin 44, a leaf spring, lead, coaxial cable, or flexible printed circuit, for example, can be used to electrically connect the feed part 404 of the antenna 40 and the circuit board 25, and supply a specific potential.

Variation 8

Figure 15:
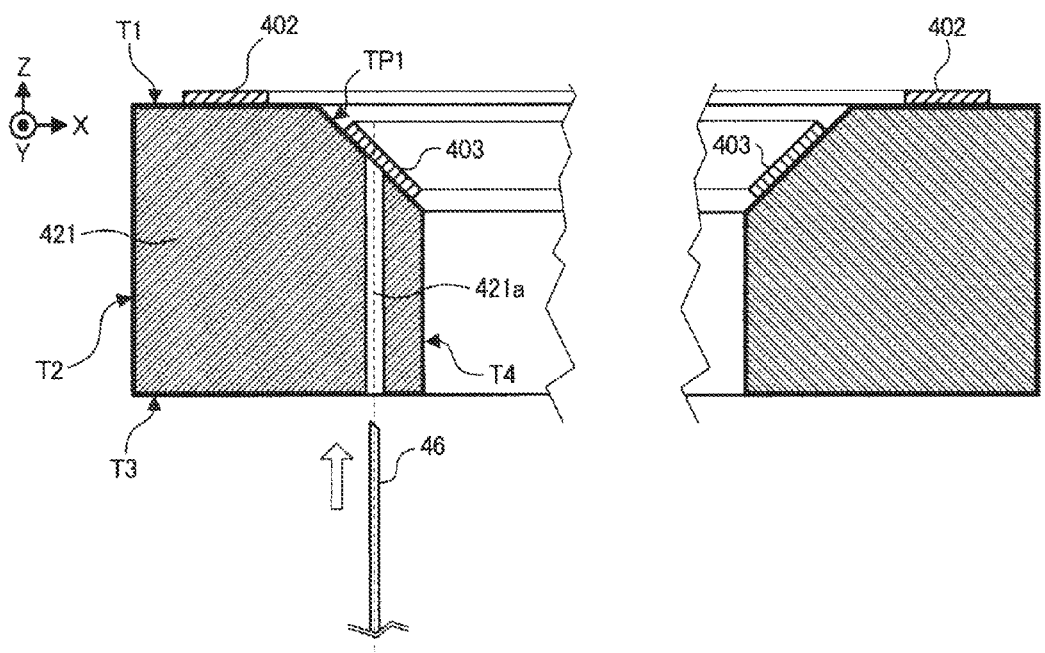
FIG. 15 is a section view of the antenna in variation 8 of the preferred embodiment.

FIG. 15 is a section view of the antenna in variation 8, and is the same as the view in FIG. 5C. The antenna in this variation differs from the antenna 40 shown in FIG. 5 in that (1) the base 421 has a vertical inside face T4 instead of slope TP2, (2) there is no feed part 404, and (3) a hole 421a is formed from the slope TP1 to the bottom T3 of the base 421. Note that there is only one hole 421a, and similarly to the feed position 403a described above, the hole 421a is formed in the direction of approximately 8:00 to approximately 10:00 from the center (center pivot 12) of the electronic timepiece 100 in plan view.

When the antenna according to this variation is used, a rod-shaped feed pin 46 is used instead of the feed pin 44 described above. This feed pin 46 is made of metal or other conductive material, one end is inserted to the hole 421a, and the distal end thereof is connected to the driven element 403. The other end of the feed pin 46 is connected to the wiring pattern on the circuit board 25, and a specific potential is supplied thereto. With this configuration there is no need to form a feed part 404 on the surface of the base 421 (dielectric). Disposing a feed part 404 to the antenna is thus not necessary.

Variation 9

The second hand 13a can be omitted. The time display unit is also not limited to indicating the time by rotating hands 13 over a dial 11, and could have an LCD panel with a display area of a size equal to the dial 11, and display the time by displaying an image of a dial 11 and hands 13 in the display area.

Variation 10

Figure 16:
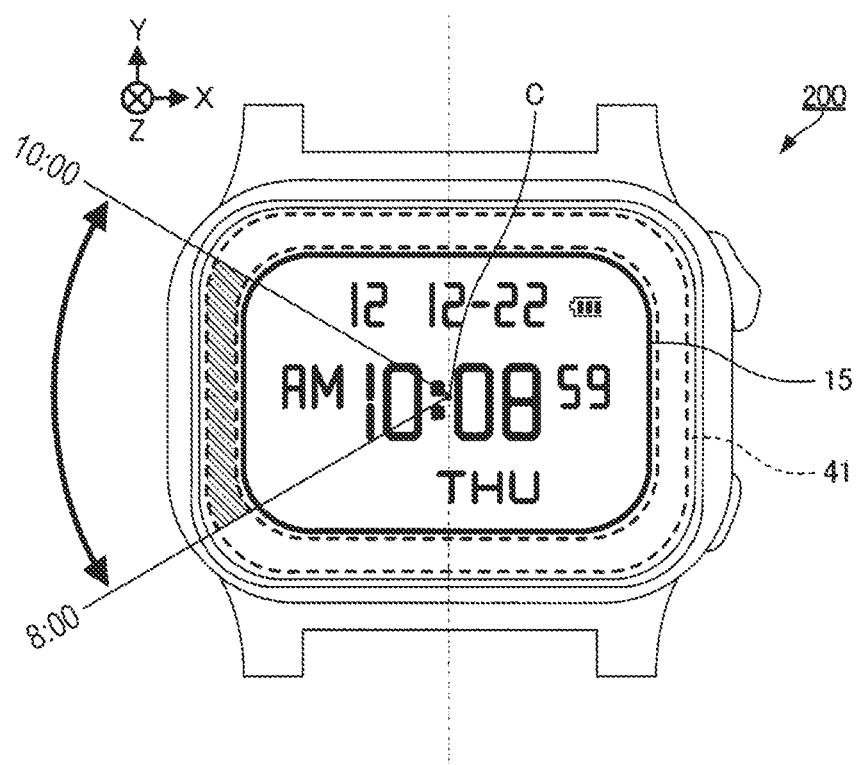
FIG. 16 is a plan view of the electronic timepiece in variation 10 of the preferred embodiment.

FIG. 16 is a plan view of an electronic timepiece 200 according to variation 10.

The electronic timepiece 200 in this variation has a rectangular case in which an annular antenna 41 is housed. The shape of the ring (loop) of the antenna 41 is substantially rectangular. An LCD panel 15 that displays time digitally is disposed on the inside of the antenna 41. While the shape of the ring differs from the antenna 40 shown in FIG. 5, the antenna 41 similarly has a base (dielectric), parasitic element, driven element, and feed part, and a specific potential is supplied to the driven element through the feed pin and feed part.

In the electronic timepiece 200 with a digital display as described above, the feed position (location of the feed pin and feed part) is disposed in the area from approximately 8:00 to approximately 10:00 relative to the center C of the electronic timepiece 200 when the electronic timepiece 200 is seen in plan view.

Variation 11

The number of conductive pins 93 and conductive springs 90a are also not limited to four, and there may be one or more. The conductive pins 93 and conductive springs 90a can also be omitted, in which event the driven element 403 resonates with the case 80.

The side of the case in the foregoing embodiments includes the case 80 and bezel 81, but the side of the case can be manufactured as a single member by molding a plastic, ceramic, or other non-conductive material.

A charging method other than solar charging may also be used. For example, a charging coil can be used to charge the storage battery with power produced by electromagnetic induction from an external charger.

A lithium battery or other primary cell can also be used instead of a storage battery 27.

Variation 12

The foregoing embodiments are described using GPS satellites, but the invention is not so limited and can be used with Global Navigation Satellite Systems (GNSS) such as Galileo (EU), GLONASS (Russia), Beidou (China), and IRNSS (India), as well as the Satellite Based Augmentation System (SBAS) or the Quasi-Zenith Satellite System (QZSS). An electronic timepiece 100 according to the invention can thus receive radio signals from manmade satellites other than GPS satellites 20 to adjust the internal time.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No. 2012-209260, filed Sep. 24, 2012 is expressly incorporated by reference herein.

What is claimed is:

1. An electronic timepiece with internal antenna, comprising:
   a cylindrical case;
   a back cover that covers an opening of the cylindrical case;
   an annular antenna; and
   a time display unit that displays time;
   wherein the antenna includes an annular dielectric, a conductive driven element that is disposed on the dielectric, is ring-shaped with a notch therein, and is fed with a specific potential, and a conductive parasitic element that is disposed on the dielectric with a gap to the driven element, and is an endless ring or a ring with a notch therein, wherein the conductive parasitic element is electrically isolated from potential supplied by an external source;
   a feed position to which a specific potential is fed is disposed to the driven element at one place, and
   the feed position is disposed in a range from approximately 8:00 to approximately 10:00 relative to the center of the electronic timepiece with internal antenna when the electronic timepiece with internal antenna is seen in plan view.

2. The electronic timepiece with internal antenna described in claim 1, wherein:
   the driven element is disposed on the inside of the parasitic element relative to the center axis of the dielectric.

3. The electronic timepiece with internal antenna described in claim 1, wherein:
   the dielectric has a flat top surface, and a slope formed from the top surface so that the height to the time display unit decreases to the inside; and
   the driven element is disposed on the slope.

4. The electronic timepiece with internal antenna described in claim 1, further comprising:
   a circuit board having a reception circuit disposed thereto; and
   a coil spring that is disposed at the feed position, and feeds a specific potential to the driven element;
   wherein one end of the coil spring is electrically connected to the driven element, the other end is electrically connected to the circuit board and is fed with the specific potential, and the side part not including both ends is surrounded by a cylindrical conductive member to which ground potential is supplied.

* * * * *